United States Patent
Kline et al.

(10) Patent No.: US 11,150,104 B2
(45) Date of Patent: Oct. 19, 2021

(54) ROUTE MANAGEMENT UTILIZING GEOLOCATION BASED CLUSTERING

(71) Applicant: INTERNATIONAL BUSINESS MACHINES CORPORATION, Armonk, NY (US)

(72) Inventors: Eric V. Kline, Pine Island, MN (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 16/669,569

(22) Filed: Oct. 31, 2019

(65) Prior Publication Data

US 2021/0131820 A1 May 6, 2021

(51) Int. Cl.
| | |
|---|---|
| *G01C 21/36* | (2006.01) |
| *G08G 1/01* | (2006.01) |
| *H04W 4/021* | (2018.01) |
| *G06K 9/00* | (2006.01) |
| *G01C 21/34* | (2006.01) |

(52) U.S. Cl.
CPC ..... *G01C 21/3691* (2013.01); *G01C 21/3461* (2013.01); *G06K 9/00791* (2013.01); *G08G 1/0112* (2013.01); *H04W 4/021* (2013.01)

(58) Field of Classification Search
CPC ............ G01C 21/3461; G01C 21/3691; G06K 9/00791; G08G 1/0112; H04W 4/021; H04W 4/44

See application file for complete search history.

(56) References Cited

U.S. PATENT DOCUMENTS

| | | | |
|---|---|---|---|
| 8,374,594 B2 * | 2/2013 | Yamato | G08G 1/096716 455/422.1 |
| 9,697,485 B2 * | 7/2017 | Mason | G06Q 10/0631 |
| 9,978,284 B2 * | 5/2018 | Riedelsheimer | G08G 1/0112 |
| 10,037,030 B2 | 7/2018 | Bostick | |

(Continued)

FOREIGN PATENT DOCUMENTS

WO 2018179778 A1 10/2018

OTHER PUBLICATIONS

Anonymous, "Smart Road Entry Control System", Feb. 14, 2014; Database: IP.com; IP.com No. IPCOM000234915D, pp. 1-3.

(Continued)

*Primary Examiner* — Babar Sarwar
(74) *Attorney, Agent, or Firm* — Tihon Poltavets

(57) ABSTRACT

A method for route management based on geolocation based clustering includes receiving data collected from a plurality of vehicles for a plurality of clusters. The method generates an initial set of rules for the plurality of vehicles operating in each cluster from the plurality of clusters based on the data collected from the plurality of vehicles. The method determines a first cluster out of the plurality of cluster based on a geolocation of a first vehicle traveling along a route. Responsive to identifying a set of cluster specific rules for the first cluster, the method determines a first hardware requirement out of the plurality of hardware requirements defined by the set of cluster specific rules is not present on the vehicle. The method identifies an alternative cluster based on the first hardware requirement being absent and instructs the vehicle to travel to the alternative cluster.

20 Claims, 6 Drawing Sheets

(56) References Cited

U.S. PATENT DOCUMENTS

| | | | | |
|---|---|---|---|---|
| 10,073,463 | B2* | 9/2018 | Smith | B62D 1/283 |
| 10,231,079 | B2* | 3/2019 | Barron | H04W 4/021 |
| 10,952,042 | B2* | 3/2021 | Menzel | H04W 4/40 |
| 2007/0027610 | A1* | 2/2007 | Parikh | G08G 1/20 |
| | | | | 701/117 |
| 2010/0216498 | A1* | 8/2010 | Mintah | H04W 4/08 |
| | | | | 455/507 |
| 2015/0100225 | A1* | 4/2015 | Fuehrer | G08G 1/096783 |
| | | | | 701/118 |
| 2017/0055122 | A1* | 2/2017 | Barron | H04W 4/021 |
| 2017/0227368 | A1* | 8/2017 | Bryson | G01C 21/343 |
| 2017/0337813 | A1* | 11/2017 | Taylor | G08G 1/0965 |
| 2017/0344003 | A1* | 11/2017 | Bostick | B60W 30/00 |
| 2018/0203130 | A1* | 7/2018 | Neubecker | G01S 5/0072 |
| 2018/0322791 | A1* | 11/2018 | Brooks | G08G 1/22 |
| 2018/0329428 | A1* | 11/2018 | Nagy | G05D 1/0088 |
| 2018/0365908 | A1* | 12/2018 | Liu | G05D 1/0044 |
| 2019/0120964 | A1* | 4/2019 | Luo | G01S 17/86 |
| 2019/0236941 | A1* | 8/2019 | Lindsay | B60Q 1/44 |
| 2019/0236959 | A1* | 8/2019 | Belapurkar | G08G 1/202 |
| 2019/0251848 | A1* | 8/2019 | Sivanesan | H04L 5/0048 |
| 2019/0349796 | A1* | 11/2019 | Hehn | H04W 4/70 |
| 2020/0053400 | A1* | 2/2020 | Chao | H04W 4/021 |
| 2020/0111272 | A1* | 4/2020 | Ferre Fabregas | G05B 19/048 |
| 2020/0276977 | A1* | 9/2020 | Saleh | B60W 60/001 |
| 2020/0278214 | A1* | 9/2020 | Arkin | G01C 21/3438 |
| 2020/0344820 | A1* | 10/2020 | Fowe | H04W 76/10 |
| 2021/0033415 | A1* | 2/2021 | Zahedi | G06Q 10/08 |
| 2021/0049896 | A1* | 2/2021 | Kleve | G08B 27/003 |
| 2021/0109544 | A1* | 4/2021 | Rakshit | G05D 1/0297 |

OTHER PUBLICATIONS

Autonomous Vehicles, "Self-Driving Vehicles Enacted Legislation", Mar. 19, 2019, http://www.ncsl.org/research/transportation/autonomous-vehicles-self-driving . . . , pp. 1-17.

Geurts et al., "Clustering and Profiling Traffic Roads by Means of Accident Data", http://www.researchgate.net/publications/250240712_Clustering_and_Profiling_Traffic_Roads_by_Means_of_Accident_Data, May 2010, pp. 1-22.

Liu et al., "Deployment Strategy for Car-Sharing Depots by Clustering Urban Traffice Big Data Based on Affinity Propagation", Hindaw Scientific Programming, vol. 2018, Article ID 3907513, pp. 1-8.

Locklear, "US Department of Transportation Updates Autonomous Car Rules", Oct. 4, 2018, http://www.engadget.com/2018/10/04/US-department-of-transportation . . . , pp. 1-8.

Mell et al., "The NIST Definition of Cloud Computing", National Institute of Standards and Technology, Special Publication 800-145, Sep. 2011, pp. 1-7.

Newcomb, "New Data Platform Helps Autonomous Vehicles Learn Rules of the Road Directly From Cities", http://www.forbes.com/sites/dougnewcomb/2018/07/17/new-data-platform . . . , 2018, pp. 1-3.

Sun, "Point cloud clustering algorithm for autonomous vehicle based on 2.5D Gaussian Map", Proceedings of the Second International Conference on Inventive Systems and Control (ICISC 2018) IEEE Xplore Compliant—Part No. CFP18J06-ART, ISBN:978-1-5386-0807-4; DVD Part No. CFP18J06DVD, ISBN:978-1-5386-0806-7, IEEE 2018, pp. 754-759.

\* cited by examiner

ROUTE MANAGEMENT UTILIZING GEOLOCATION BASED CLUSTERING

FIELD OF INVENTION

This disclosure relates generally to route management, and in particular to utilizing geolocation based clustering and cluster based rules for route management.

BACKGROUND OF THE INVENTION

Presently, various roads and geolocations utilize physical signage to relay speed limits, traffic condition information, and potential hazards to an operator of a vehicle. However, certain driving situations and/or conditions are typically not immediately, if at all relayed to the operator of the vehicle. Decreased visibility due to precipitation from a newly formed thunderstorm cell or presence of an animal near a roadside area, represent examples of situations which are typically not translated to the operator via physical signage. Depending on the situation, certain vehicle requirements can be temporary enforced in a given area to ensure the safety of all the vehicles operating on a given road. Furthermore, when traveling across borders between two different jurisdictions, a first jurisdiction can enforce a set of vehicle rules and requirements subsequently different from a second jurisdiction, where the requirements may not be apparent to the operator of the vehicle.

SUMMARY

Embodiments in accordance with the present invention disclose a method, computer program product and computer system for route management utilizing geolocation based clustering, the method, computer program product and computer system can receive data collected from a plurality of vehicles for a plurality of clusters, where the data collected from each of the plurality of vehicles includes a registered event. The method, computer program product and computer system can generate an initial set of rules for the plurality of vehicles operating in each cluster from the plurality of clusters based on the data collected from the plurality of vehicles. The method, computer program product and computer system can determine a first cluster out of the plurality of cluster based on a geolocation of a first vehicle out of the plurality of vehicles traveling along a route. The method, computer program product and computer system can, responsive to identifying a set of cluster specific rules for the first cluster based on the geolocation of the vehicle, determine whether a plurality of hardware requirements defined by the set of cluster specific rules are present on the vehicle. The method, computer program product and computer system can, responsive to determining a first hardware requirement out of the plurality of hardware requirements defined by the set of cluster specific rules is not present on the vehicle, identifying an alternative cluster based on the first hardware requirement being absent. The method, computer program product and computer system can instruct the vehicle to travel to the alternative cluster.

DETAILED DESCRIPTION

Embodiments of the present invention utilize geolocation based clustering to manage a route of a vehicle based on one or more hardware requirements associated with each cluster. For each cluster out of a plurality of clusters, data is collected from multiple vehicles operating within each of the plurality of clusters. Embodiments of the present invention generate an initial set of rules for the multiple vehicles in each of the plurality of clusters based on the collected data. As a particular vehicle travels along a route, embodiments of the present invention determine a cluster based on a geolocation of the particular vehicle. In response to identifying the cluster for the particular vehicle, embodiments of the present invention identify a set of cluster specific rules based on the geolocation of the vehicle. In response to determining the particular vehicle includes required hardware to adhere to the identified set of cluster specific rules, instructing the particular vehicle to travel through the cluster. Alternatively, in response to determining the particular vehicle does not include required hardware to adhere to the identified set of cluster specific rules, identifying an alternative cluster based on the absent hardware and instructing the particular vehicle to travel to the alternative cluster.

Figure 1:
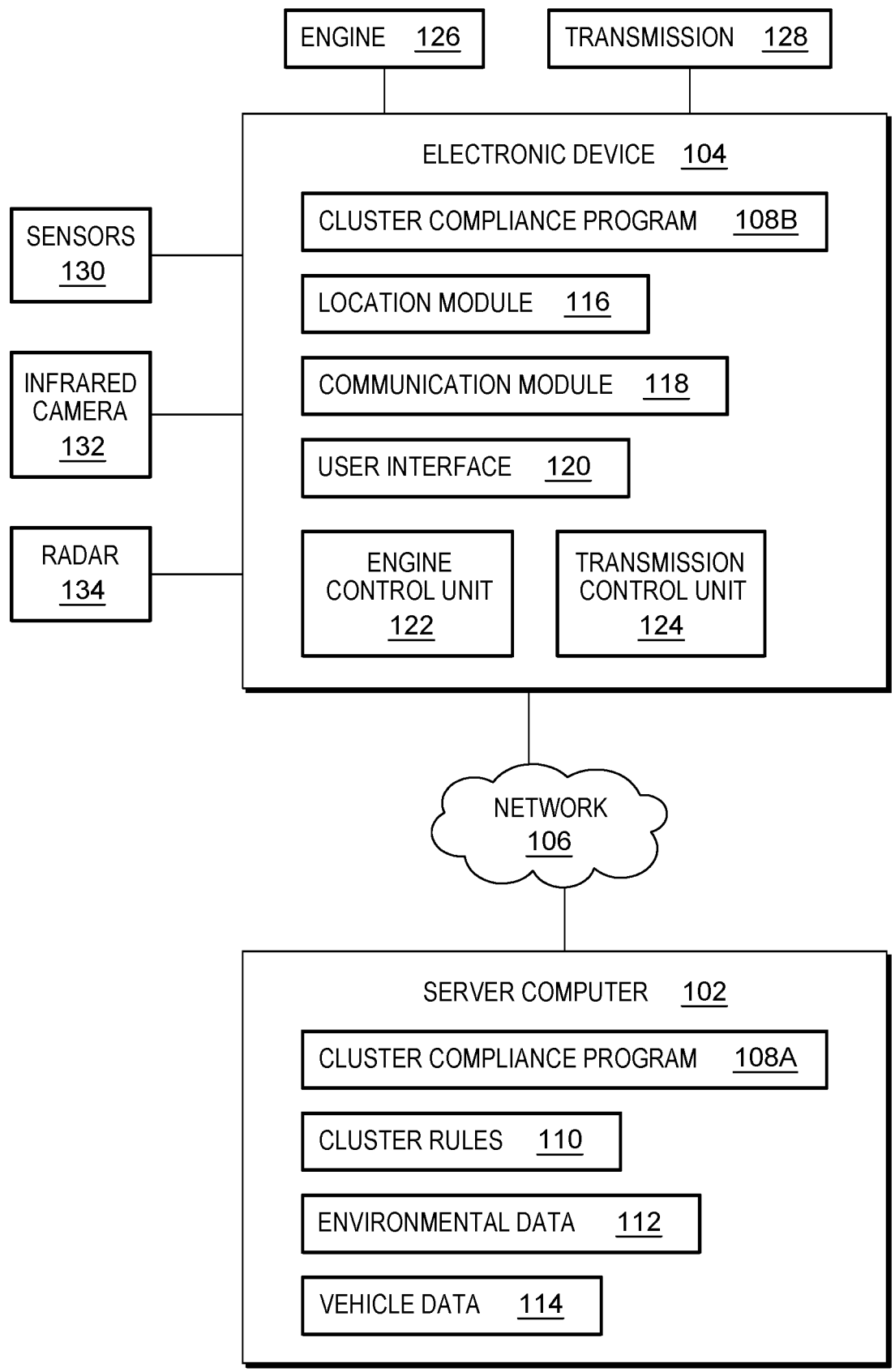
FIG. 1 is a functional block diagram illustrating a distributed data processing environment, in accordance with an embodiment of the present invention.

FIG. 1 is a functional block diagram illustrating a distributed data processing environment, in accordance with one embodiment of the present invention. The distributed data processing environment includes server computer 102 and electronic device 104 all interconnected over network 106. For discussion purposes, cluster compliance program 118 can operate on server side as cluster compliance program 108A on server computer 102 or user side as cluster compliance program 108B on electronic device 104.

Server computer 102 may be a desktop computer, a laptop computer, a tablet computer, a specialized computer server, a smartphone, or any computer system capable of executing the various embodiments of cluster compliance program 108A. In certain embodiments, server computer 102 represents a computer system utilizing clustered computers and components that act as a single pool of seamless resources when accessed through network 106, as is common in data centers and with cloud computing applications. In general, server computer 102 is representative of any programmable electronic device or combination of programmable electronic devices capable of executing machine-readable program instructions and communicating with other computer devices via a network. In this embodiment, server computer 102 has the ability to communicate with other computer devices to query the computer devices for information. Server computer 102 includes cluster compliance program 108A, cluster rules 110, environmental data 112, and vehicle data 114. In this embodiment, cluster compliance program 108A represents a server side based cluster compliance program 108.

Electronic device 104 may be a microprocessor, a microcontroller, or any computing device capable of integrating functions of cluster compliance program 108B, location module 116, communication module 118, user interface 120, engine control unit (ECU) 122, and transmission control unit (TCU) 124. Alternatively, cluster compliance program 108A, location module 116, communication module 118, user interface 120, ECU 122, and TCU 124 each operate independently without electronic device 104 utilizing a Controller Area Network (CAN bus). User interface 120 of electronic device 104 allows for a user (i.e., vehicle operator) to interact with and communicate with cluster compliance program 108B. In this embodiment, cluster compliance program 108B represents a user side (i.e., vehicle operator) based cluster compliance program 108. In general, electronic device 104 is representative of any programmable electronic device or combination of programmable electronic devices capable of executing machine-readable program instructions and communicating with users of other electronic devices via network 106. Electronic device 104 may include components, as depicted and described in further detail with respect to FIG. 4, in accordance with embodiments of the present invention.

In general, network 106 can be any combination of connections and protocols that will support communications between server computer 102 and electronic device 104. Network 106 can include, for example, a local area network (LAN), a wide area network (WAN), such as the internet, a cellular network, or any combination of the preceding, and can further include wired, wireless, and/or fiber optic connections. In one embodiment, cluster compliance program 108A can be a web service accessible via network 106 to a user of electronic device 104. In another embodiment, cluster compliance program 108A may be operated directly by a user of server computer 102.

Cluster compliance program 108 utilizes geolocation based clustering to manage a route of a vehicle based on one or more hardware requirements associated with each cluster. Cluster compliance program 108 receives data collected from multiple vehicles and generated an initial set of rules for the multiple vehicles. Cluster compliance program 108 determines a cluster based on a geolocation of a vehicle traveling along a route and identifies a set of cluster specific rules based on the geolocation of the vehicle. Cluster compliance program 108 determines whether the vehicle traveling along the route has required hardware present based on the identified set of cluster specific rules. Responsive to cluster compliance program 108 determining the vehicle traveling along the route does have the required hardware, cluster compliance program 108 instructs the vehicle to travel through the cluster. Responsive to cluster compliance program 108 determining the vehicle traveling along the route does not have the required hardware, cluster compliance program 108 identifies an alternative cluster based on the absent hardware and instructs the vehicle to travel to the alternative cluster. Responsive to determining the vehicle is still traveling, cluster compliance program 108 reverts back to determining a cluster based on the geolocation of the vehicle traveling along a route.

Cluster rules 110 represent a plurality set of cluster specific rules, where each set of cluster specific rules from the plurality set of cluster specific rules are associated with a single cluster applicable to a vehicle traveling through the single cluster. A cluster represents a geographical area defined by one or more static and dynamic considerations, where a first cluster with a first static consideration can overlap a second cluster with a second dynamic consideration. Example of one or more static considerations can include borders of towns, cities, states, regions, and countries. Furthermore, one or more static considerations can include physical geographical boundaries such as rivers, lakes, oceans, and mountain ranges. Examples of one or more dynamic considerations can include areas of severe weather, dense fog, flash flooding, wildlife activity, police activity, and vehicle restrictions.

Cluster compliance program 108 can manages the clusters defined by weather related dynamic considerations based on environmental data 112. Environment data 112 includes any weather condition information and road condition information, where environmental data 108 is freely available or accessible via a subscription based service. Weather condition information includes but is not limited to wind speed, type of precipitation, precipitation rates, humidity levels, dew point temperature, ambient temperature, and visibility distances. Environment data 112 can also include warnings (e.g., winter storm warning or tornado warning) issued by an agency, such as the National Weather Service (NWS), relating to extreme or hazardous related weather events. Road condition information includes but is not limited to road surface condition (e.g., potholes, ice), traffic information, accident information, debris information (e.g., fallen tree), disabled vehicle, and road works. Cluster compliance program 108 has the ability to ability to receive and analyze environment data 112 to define a cluster based on one or more dynamic considerations and apply a set of cluster rules from cluster rules 110 to the defined cluster.

Vehicle data 114 includes manufacturer information for a vehicle based on a make, model, and/or Vehicle Identification Number (VIN). The manufacture information can include brake distances in the dry and wet with no payload, brake distances in the dry and wet with max payload, wading depth, and safety equipment installed on the vehicle. Safety equipment can include items such as, sensors 130, infrared camera 132, and radar 134. Cluster compliance program 108 utilizes vehicle data 114 to determine if a vehicle traveling through a cluster adheres to a set of cluster specific rules.

Location module 116 allows for cluster compliance program 108A to identify a location of a vehicle with electronic device 104. In this embodiment, location module 116 is a Global Positioning System (GPS) that cluster compliance program 108B utilizes to monitor a location for the vehicle. Communication module 118 allows for cluster compliance program 108B to communicate with cluster compliance program 108A on server computer 102, via network 106. User interface 120 enables a user to make requests of or issue commands to electronic device 104 and receive information and instructions in response. In one embodiment, user interface 120 is a voice user interface (VUI) for a user of electronic device 104 to access via voice commands in natural language. In one embodiment, user interface 120 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 120 enables a user of electronic device 104 to interact with cluster compliance program 108.

Engine control unit (ECU) 122, also known as an engine control module (ECM), is an electronic device that controls and monitors various actuators of engine 126. ECU 122 utilizes a software component capable of controlling and monitoring performance output and operation parameters of engine 126. Transmission control unit (TCU) 124 is an electronic device that controls and monitors various parameters of transmission 128. Similar to ECU 122, TCU 124 utilizes a software component capable of controlling and monitoring performance output and operational parameters of transmission 128.

Sensors 130, infrared camera 132, and radar 134 represent hardware which cluster compliance program 108 determines whether or not is required for traveling through a cluster depending on the identified set of cluster specific rules. Sensors 130 can include electromagnetic, ultrasonic, sonar, lidar, laser, and camera detection systems integrated into various driver assistance systems such as parking assist systems, blind spot monitoring, lane keeping system, and rear cross traffic alert systems. Infrared camera 132, also referred to as a thermographic camera, represents a device capable of forming a heat zone image utilizing infrared radiation. Infrared cameras 132 allow for detection of heat signatures from humans, wildlife, and other vehicles and are beneficial for instances of low visibility (i.e., dense fog, roadside debris). Radar 134 represents a device capable of detecting objects in a line of sight of radar 134 and is typically integrated into various driver assistance systems such as, adaptive cruise control.

Figure 2:
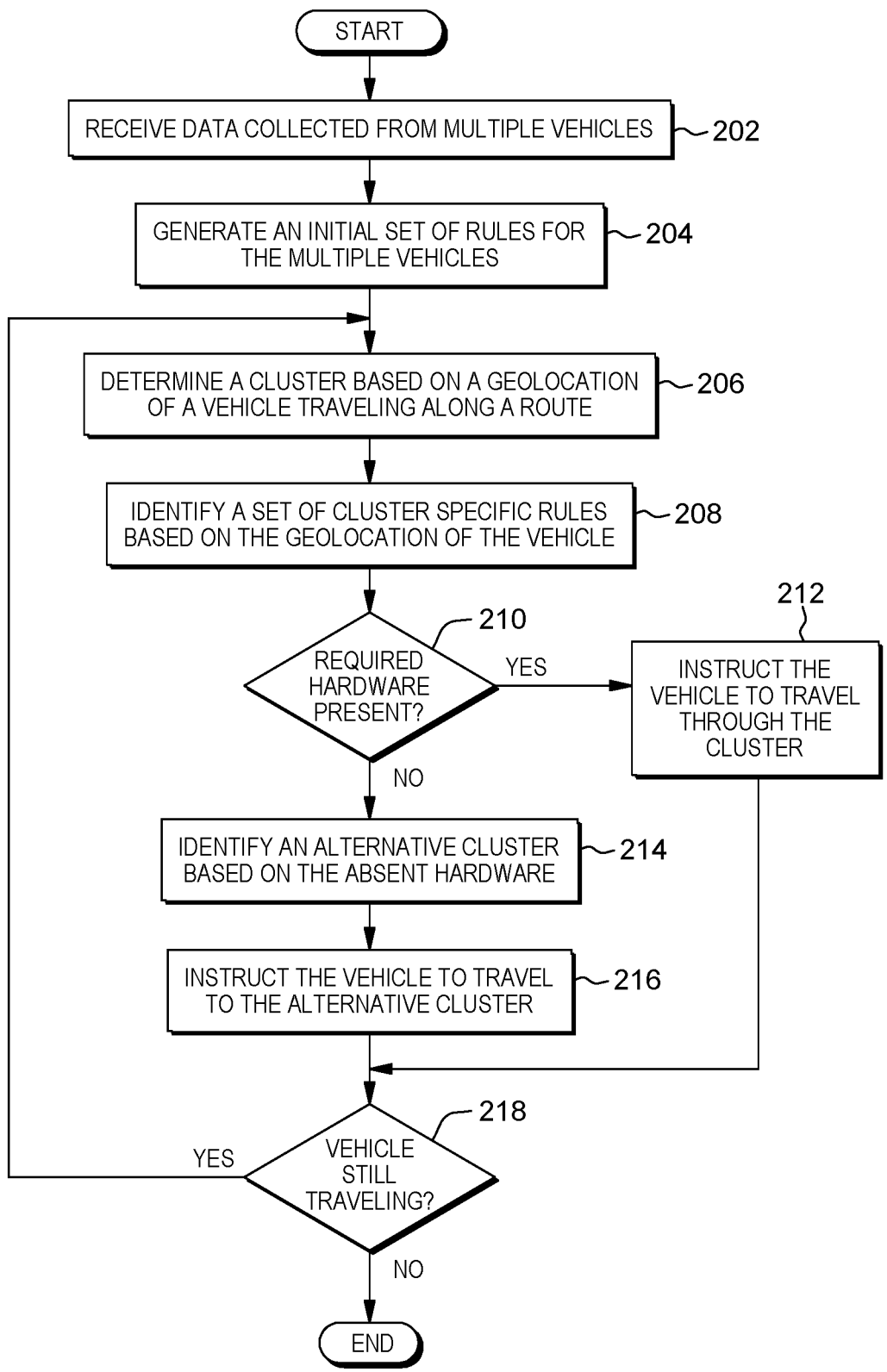
FIG. 2 is a flowchart depicting operational steps of a cluster compliance program for route management of a vehicle based on multiple sets of rules, in accordance with an embodiment of the present invention.

FIG. 2 is a flowchart depicting operational steps of a cluster compliance program for route management of a vehicle based on multiple sets of rules, in accordance with an embodiment of the present invention.

Cluster compliance program 108A receives (202) data collected from multiple vehicles. The data collected represents various information captured by one or more sensors (e.g., sensors 130), cameras (e.g., infrared camera 132), and radars (e.g., radar 134) positioned on the vehicle, along with an associated GPS location and time stamp for when the data was collected for the vehicle. Cluster compliance program 108A can continuously receive data collected from the multiple vehicle, intermittently receive data collected from the multiple vehicles in set time intervals, and/or receive data collected from the multiple vehicle whenever an event is registered in the data collected. In one example, a registered event includes a rain sensor on a vehicle detecting precipitation. In another example, a registered event includes an infrared camera on a vehicle detecting a presences of heat signatures corresponding to wildlife, where the wildlife is within a proximity of a lane of travel of the vehicle. In yet another example, a registered event includes one or more safety systems being activated on a vehicle, where the activation of the one or more safety systems includes a forward collision warning, a forward collision braking, a blind spot alert, a lane keep alert, and/or a rear cross traffic alert.

Furthermore, cluster compliance program 108A can receive data collected from the multiple vehicles that includes identified road context (e.g., wildlife movement, pedestrian movement, and vehicle movements) and surrounding context (e.g., weather conditions and road conditions). The data can further include one or more driving decisions and/or actions performed by the operator of the vehicle or the vehicle in a semi-autonomous and/or full-autonomous manner, along with an event that caused the one or more driving decisions and/or actions performed by the operator of the vehicle or the vehicle.

In this embodiment, cluster compliance program 108A receives data from each of the multiple vehicles operating within each of the plurality of clusters. As previously discussed, a cluster represents a geographical area defined by one or more static and dynamic considerations. For a cluster with one or more static considerations, cluster compliance program 108A receives data from each vehicle as the vehicle enters the cluster with the one or more static consideration. In one example, a cluster includes a static consideration which is based on borders of a state, where a vehicle crossing into the state enters the cluster and transmits data to cluster compliance program 108A. Cluster compliance program 108A receives the data from the vehicle, associates the data from the vehicle with the cluster, and stores the data along with the association for the vehicle. For a cluster with one or more dynamic considerations, cluster compliance program 108A receives data from each vehicle as the vehicle enters the cluster with one or more dynamic considerations. In one example, a cluster includes a dynamic consideration associated with severe weather activity, where a vehicle entering an area of severe weather (e.g., thunderstorm cell) and transmits data to cluster compliance program 108A. Cluster compliance program 108A receives the data from the vehicle, associates the data from the vehicle with the cluster with the one or more dynamic considerations, and stores the data along with the association for the vehicle. As the severe weather moves across a geographical area, the cluster with the one or more dynamic considerations moves along with the severe weather. As a result, the cluster with one or more dynamic considerations can move from a first cluster with a first static consideration to a second cluster with a second static consideration.

Cluster compliance program 108A generates (204) an initial set of rules for the multiple vehicles. In this embodiment, cluster compliance program 108A generates the initial set of rules for the multiple vehicles operating in a cluster based on the data collected from the multiple vehicles. For example, cluster compliance program 108A previously received data collected from multiple vehicles in a first cluster, where the data indicated the presences of wildlife activity in an area obscured by roadside debris. Cluster compliance program 108A determines that a typical radar on a vehicle would not capture the wildlife activity, since the roadside debris would obscure the wildlife. However, an infrared camera on a vehicle can capture the heat signature of the wildlife and therefore, the vehicle would have the ability to safely monitor the movement of the wildlife and take evasive action if the wildlife were to approach a direction of travel of the vehicle. Cluster compliance program 108A generates a first initial rule for the initial set of rules for the multiple vehicle that requires each vehicle be equipped with an infrared camera for traveling through the cluster, until the cluster compliance program 108A receives data collected from the multiple vehicles that the wildlife is no longer present. In another example, cluster compliance program 108A previously received data collected from multiple vehicles in a cluster, where the data indicated the presence of snow based precipitation. Cluster compliance program 108A generates a second initial rule for the initial set of rules for the multiple vehicles that requires each vehicle be equipped with snow tires for traveling through the cluster. In yet another example, cluster compliance program 108A previously received data collected from multiple vehicles in a cluster, where the data indicated the presence of a large quantity of vehicles and pedestrian movement. Cluster compliance program 108A generates a third initial rule for the initial set of rules for the multiple vehicles that requires each vehicle be operated manually or in a semi-autonomous manner, rather than in a full-autonomous manner.

Cluster compliance program 108A determines (206) a cluster based on a geolocation of a vehicle traveling along a route. In one example, cluster compliance program 108A receives an intended travel plan for a vehicle between an origin location and a destination location, where cluster compliance program 108A determines one or more clusters based on the geolocation of the vehicle traveling along the intended travel plan. Furthermore, cluster compliance program 108A determines one or more surrounding clusters based on the geolocation of the vehicle traveling along the intended travel plan, where the one or more surrounding clusters can provide an alternative travel plan between the origin location and the destination location if one or more hardware requirements aren't present of the vehicle. As previously discussed, a cluster with one or more dynamic consideration can overlay with another cluster with one or more static considerations. Therefore, cluster compliance program 108A can determine multiple clusters based on the geolocation of the vehicle traveling along a route.

In another example, cluster compliance program 108A does not receive an intended travel plan for a vehicle between an origin location and a destination location. Cluster compliance program 108A identifies a geolocation for a vehicle traveling along a route and based on a current geolocation, determines a current cluster for the current geolocation. In addition to the determining the current cluster for the current geolocation, cluster compliance program 108A determines one or more surrounding clusters based on the current geolocation and current direction of travel of the vehicle. The one or more surrounding clusters share a border with the current cluster and represent where the vehicle intends to travel next based on the current geolocation and the current direction of travel of the vehicle.

Cluster compliance program 108A has the ability to determine two or more clusters based on the geolocation of the vehicle traveling along the route. In one example, cluster compliance program 108A determines a first cluster with a first set of one or more static considerations and a second cluster with a second set of one or more static considerations are present based on the geolocation of the vehicle, where at least portion of the first cluster overlaps at least a portion of the second cluster. Depending on a classification (e.g., jurisdictional priority) of static considerations for the first cluster (e.g. state borders) and the second cluster (e.g., city borders), cluster compliance program 108A can determine which cluster takes priority (e.g., the second cluster over the first cluster). In another example, cluster compliance program 108A determines a first cluster with a first set of one or more static rules and a second cluster with a first set of one or more dynamic considerations are present based on the geolocation of the vehicle, where at least a portion of the first cluster overlaps at least a portion of the second cluster. Cluster compliance program 108A can determine that the second cluster takes priority over the first cluster due to the second cluster having one or more dynamic considerations versus the one or more static considerations of the first cluster.

Cluster compliance program 108A identifies (208) a set of cluster specific rules based on the geolocation of the vehicle. In one example, cluster compliance program 108A previously determined a single cluster based on the geolocation of the vehicle traveling along a route, where the single cluster is based on a static consideration relating to a city. Cluster compliance program 108A identifies a set of cluster specific rules for the city, where the city represents a jurisdiction in which the vehicle operates. The identified set of cluster specific rules includes one or more hardware requirements for the vehicle operating within the cluster, wherein the hardware requirements includes one or more of sensors, IR cameras, and radars installed on the vehicle. In another example, cluster compliance program 108A previously determined a first cluster and a second cluster with one or more static considerations based on the geolocation of the vehicle traveling along a route, where a portion of the first cluster overlaps a portion of the second cluster. Cluster compliance program 108A identifies a set of cluster specific rules for both the first cluster and the second cluster and applies the hardware requirements of the set of cluster specific rules to the vehicle. In yet another example, cluster compliance program 108A previously determined a first cluster with one or more static considerations and a second cluster with one or more dynamic considerations based on the geolocation of the vehicle traveling along a route, where a portion of the first cluster overlaps a portion of the second cluster. Cluster compliance program 108A identifies a set of cluster specific rules for both the first cluster and the second cluster, where the a portion of the set of cluster specific rules relating to the second cluster take priority over another portion of the set of cluster specific rules relating to the first cluster.

Cluster compliance program 108A determines (decision 210) whether the required hardware is present on the vehicle. In the event cluster compliance program 108A determines the required hardware is present on the vehicle ("yes" branch, decision 210), cluster compliance program 108A instructs (212) the vehicle to travel through the cluster. In the event cluster compliance program 108A determines the required hardware is not present on the vehicle ("no" branch, decision 210), cluster compliance program 108A identifies (214) an alternative cluster based on the absent hardware.

Cluster compliance program 108A instructs (212) the vehicle to travel through the cluster. In this embodiment, cluster compliance program 108A displays a status message to the operator of the vehicle, where the status message states that the vehicle adheres to the vehicle hardware requirements for the cluster in which the vehicle is located. Furthermore, for vehicle equipped with onboard navigational systems, cluster compliance program 108A can display an overlay on a map, where the overlay highlights the current cluster and one or more surrounding clusters depending on a scale of the map. A cluster (e.g., current cluster) for which the vehicle adheres to the vehicle hardware requirements, cluster compliance program 108A highlights the cluster in a first color (e.g., green). A cluster (e.g., a surrounding cluster) for which the vehicle does not adhere to the vehicle hardware requirements, cluster compliance program 108A highlights the cluster in a second color (e.g., red).

Cluster compliance program 108A identifies (214) an alternative cluster based on the absent hardware. In this embodiment, cluster compliance program 108A identifies one or more surrounding clusters based on the geolocation of the vehicle traveling along the intended travel plan, where the one or more surrounding clusters can provide an alternative travel plan between the origin location and the destination location if one or more hardware requirements aren't present of the vehicle. As previously discussed, a cluster with one or more dynamic consideration can overlay with another cluster with one or more static considerations. Therefore, cluster compliance program 108A can determine multiple clusters based on the geolocation of the vehicle traveling along a route. In another example, cluster compliance program 108A does not receive an intended travel plan for a vehicle between an origin location and a destination location. Cluster compliance program 108A identifies one or more surrounding clusters based on the current geolocation and current direction of travel of the vehicle. The one or more surrounding clusters border the current cluster and represent where the vehicle intends to travel next based on the current geolocation and the current direction of travel of the vehicle.

Cluster compliance program 108A identifies the one or more surrounding clusters and determines if any of the one or more surrounding clusters do not include the hardware requirements identified in the set of cluster specific rules for the current cluster. Responsive to determining a first cluster from the one or more surrounding clusters does not include the hardware requirements identified in the set of cluster specific rules for the current cluster that the vehicle did not adhere to, cluster compliance program 108A identifies first cluster as the alternative cluster. In another embodiment, cluster compliance program 108A determines a first cluster and a second cluster from a plurality of surrounding clusters does not include the hardware requirements identified in the set of cluster specific rules for the current cluster that the vehicle did not adhere to. Cluster compliance program 108A can rank the first cluster and the second cluster based on one or more travel preferences, where the one or more travel preference includes a shortest route, a fastest route, a route with the least amount of delay, a route avoiding highways, and a route with no tolls. In one example, cluster compliance program 108A determines the first cluster requires the vehicle to travel an additional 13 miles compared to the second cluster. Therefore, cluster compliance program 108A ranks the second cluster higher than the first cluster and cluster compliance program 108A identifies the second cluster as the alternative cluster. In another example, cluster compliance program 108A determines the first cluster includes a 3 minute delay due to traffic conditions and the second cluster includes a 15 minute delay due to traffic conditions. Therefore, cluster compliance program 108A ranks the first cluster higher than the second cluster and cluster compliance program 108A identifies the first cluster as the alternative cluster.

Cluster compliance program 108A instructs (216) the vehicle to travel to the alternative cluster. In this embodiment, cluster compliance program 108A displays a status message to the operator of the vehicle, where the status message states that the vehicle fails to adhere to the vehicle hardware requirements for the current cluster in which the vehicle is located and states that an alternative cluster has been selected for the vehicle. For vehicle equipped with onboard navigational systems, cluster compliance program 108A can display an overlay on a map, where the overlay highlights the current cluster and the alternative cluster. The current cluster for which the vehicle does not adhere to the vehicle hardware requirements, cluster compliance program 108A highlights the cluster in a first color (e.g., red). An alternative cluster which does not include the hardware requirements of the current cluster, cluster compliance program 108A highlights the alternative cluster in a second color (e.g., blue).

Cluster compliance program 108A determines (decision 218) whether the vehicle is still traveling. In the event cluster compliance program 108A determines the vehicle is still travel ("yes" branch, decision 218), cluster compliance program 108A revert back and determines (206) a cluster based on the vehicle traveling along the route. In the event cluster compliance program 108A determines the vehicle is no longer traveling ("no" branch, decision 218), cluster compliance program 108A ceases operations.

Figure 3:
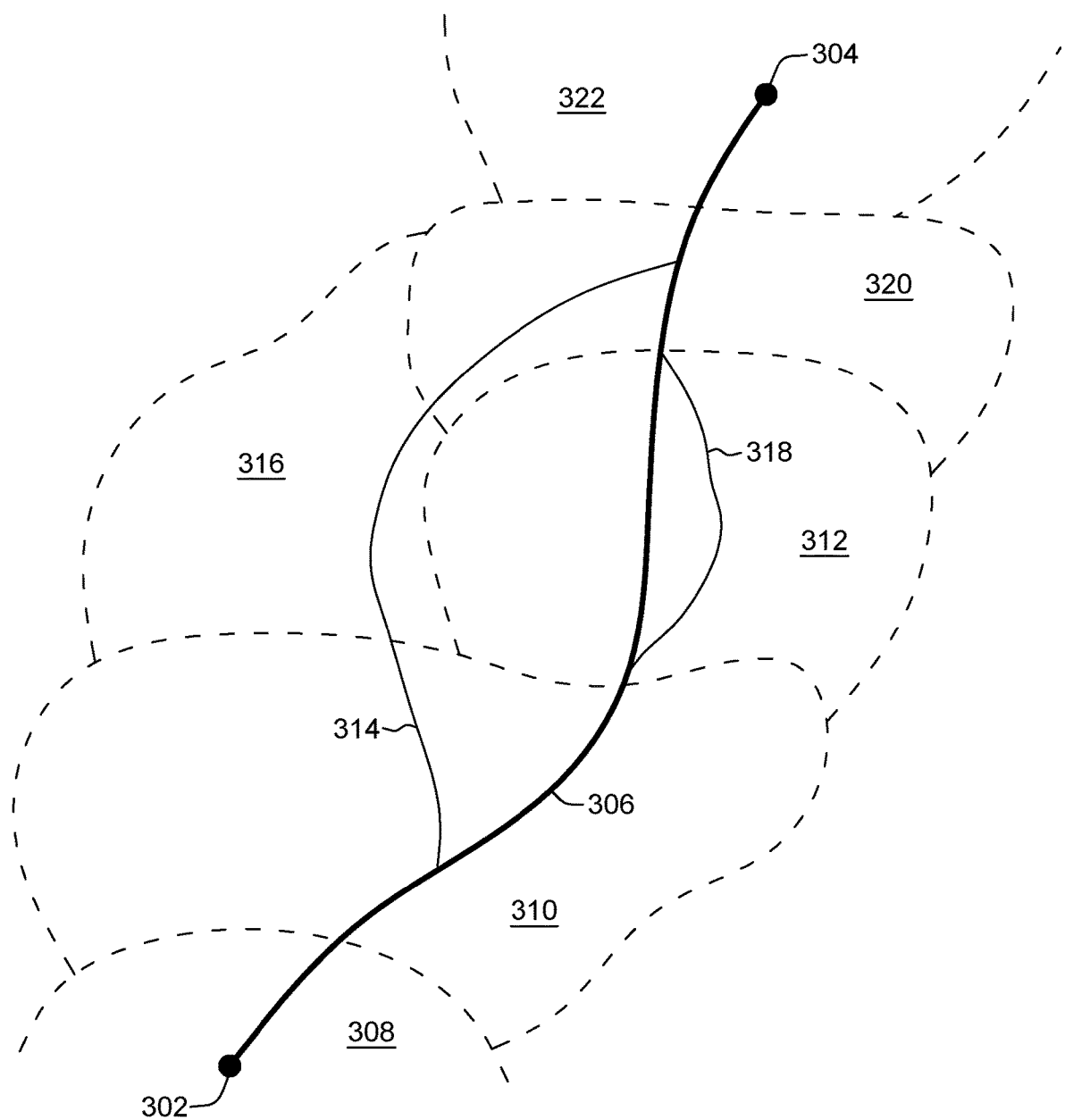
FIG. 3 illustrates an example of a cluster complaisance program managing a route based on multiple sets of rules, in accordance with an embodiment of the present invention.

FIG. 3 illustrates an example of a cluster complaisance program managing a route based on multiple sets of rules, in accordance with an embodiment of the present invention. In this embodiment, a vehicle is traveling from origin location 302 to destination location 304 along initial route 306. As the vehicle initial moves from origin location 302, cluster compliance program 108A determines a cluster based on a geolocation of the vehicle traveling along initial route 306. Based on the geolocation, cluster compliance program 108A determines the vehicle is located in cluster 308, where cluster 310 represent a surrounding cluster based on an intended direction of travel along initial route 306. Cluster compliance program 108A identifies a set of cluster specific rules for both cluster 308 and cluster 310. and responsive to determining the vehicle adheres to the hardware requirements as defined by the set of cluster specific rules for cluster 308 and cluster 310, cluster compliance program 108A instructs the vehicle to travel through cluster 308. Subsequently, cluster compliance program 108A determines the vehicle is located in cluster 310, where cluster 312 represents a surrounding cluster based on the intended direction of travel along initial route 306. Cluster compliance program 108A identifies a set of cluster specific rules for cluster 310 and cluster 312, where cluster compliance program 108A determines that the vehicle adheres to the hardware requirements as defined by the set of cluster specific rules for cluster 310 but the vehicle does not adhere to the hardware requirements as defined by the set of cluster specific rules for cluster 312.

Cluster compliance program 108A identifies an alternative cluster based on the absent hardware on the vehicle to avoid traveling along initial route 306 in cluster 312. Cluster compliance program 108A identifies cluster 316 as an alternative cluster through which the vehicle can travel along alternative route 314 to avoid cluster 312. Furthermore, in this embodiment, cluster compliance program 108A has the ability to identify an alternative route within cluster 312 based on the absent hardware on the vehicle, where the alternative route does not include the hardware requirements that the vehicle did not adhere to along initial route 306. Cluster compliance program 108A identifies alternative route 318 within cluster 312, where alternative route 318 bypasses a section of initial route 306 in cluster 312 for which the vehicle did not adhere to the hardware requirements. Cluster compliance program 108A displays alternative route 314 and alternative route 318 to the operator of the vehicle, where the operator of the vehicle has the ability to select alternative route 314 through alternative cluster 316 or alternative route 318 through cluster 312. Responsive to the operator selecting alternative route 318, cluster compliance program 108A instructs the vehicle to travel to through cluster 312 along alternative route 318. Subsequently, cluster compliance program 108A instructs the vehicle to travel through cluster 320 and cluster 322 until destination location 304 is reached.

Embodiments of the present invention further provide vehicle condition and compliance with location/cluster based rules, where for example, some jurisdictions may require vehicles to have an IR camera for legal operation (e.g., rules or laws), and a vehicle without an IR camera may not operate at night or predefined hours of a days. So, even the vehicle with an IR camera, but one that's inactive or defective, may not be legal to operate at night or perhaps at all in a certain jurisdiction). Cluster compliance program 108A can include hardware (HW) and software (SW) calibration for functionality within location defined limits (e.g., clusters). Cluster compliance program 108A can instruct each vehicle to periodically or upon jurisdictional request undergo a self-calibration of specified HW & SW operation for compliance verification. Cluster compliance program 108A can instruct the vehicles to cooperate with one another for self-calibration, where a first vehicle requiring self-calibration of an IR camera, broadcasts a request which a second vehicle receives and agrees to comply with. Cluster compliance program 108A can instruct the IR camera on the first vehicle to take a thermal shot of the second vehicle, where the second vehicle is positioned opposite the first vehicle. Cluster compliance program 108A can obtain an engine temperature reading from the second vehicle, calculate the second vehicle engine temperature based off the data received by the IR camera on the first vehicle, and compares the IR camera temperature reading with the received engine temperature received from the second vehicle. The calibration of the IR camera on the first vehicle is validated when the two temperature values are within a pre-defined limit (e.g., 10 degree), assuming a model for engine temperature estimation based off of front grill and/or hood thermal measurements and not an internal engine block reading. Alternatively, each vehicle is fitted with a calibration system for self or surrounding vehicle usage (e.g., the second vehicle is fitted with light-emitting diodes (LED) or other devices that emits at a known fixed or tunable wavelength, that is readable by the IR camera of the first vehicle, and calibration of the IR camera of the first vehicle is achieved with an agreement of the results within a specified distance). Furthermore, cluster compliance program 108A can include hardware requirements specifying that the hardware component (e.g., IR camera) be operating on a particular software version (e.g., latest software update with one or more patch fixes) and/or include a certain performance measure (e.g., 10× optical zoom).

Figure 4:
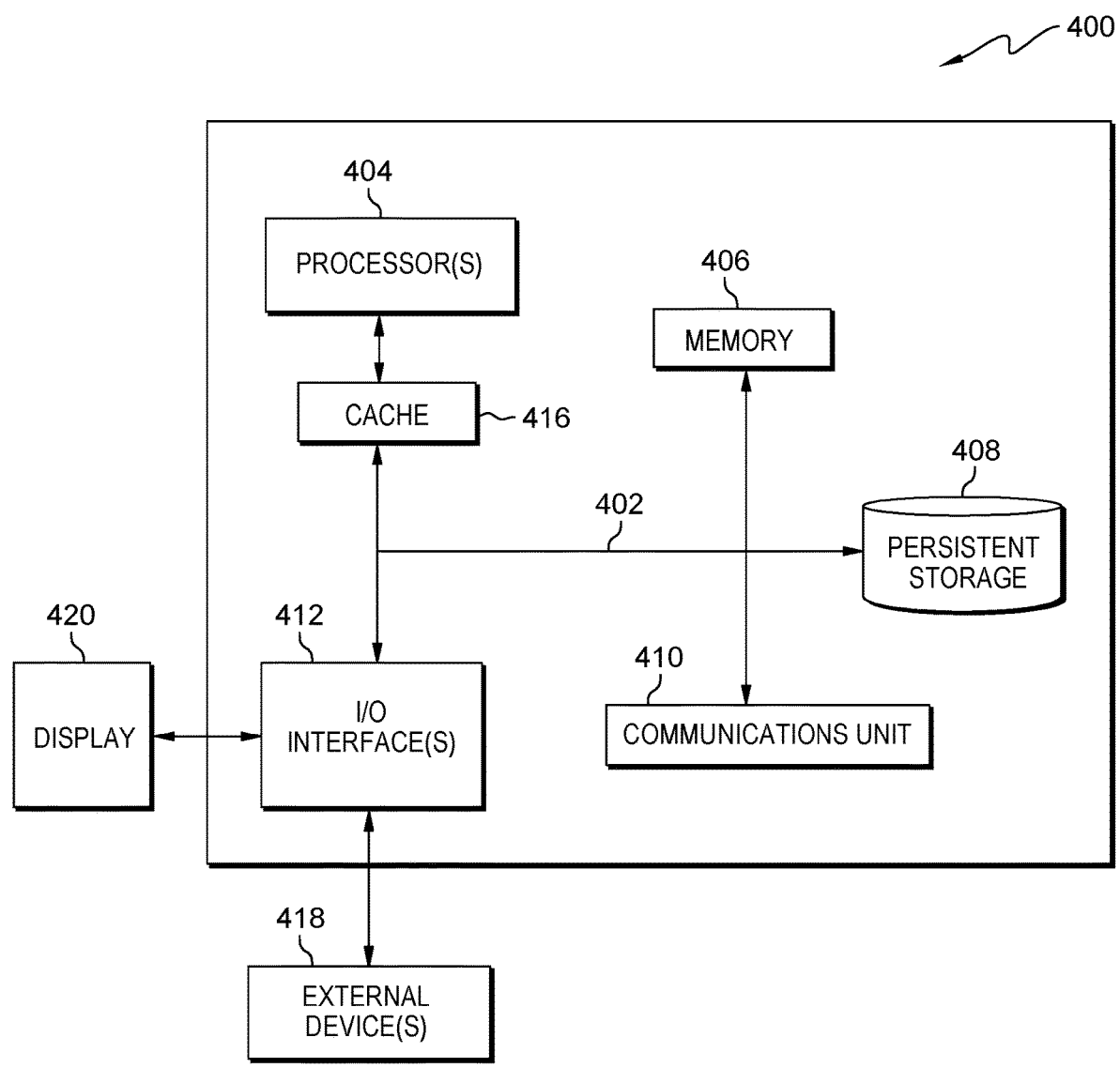
FIG. 4 is a block diagram of components of a computer system, such as the server computer of FIG. 1, in accordance with an embodiment of the present invention.

FIG. 4 depicts computer system 400, where server computer 102 and electronic device 104 are examples of a computer system 400 that includes cluster compliance program 108A and 108B, respectively. The computer system includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
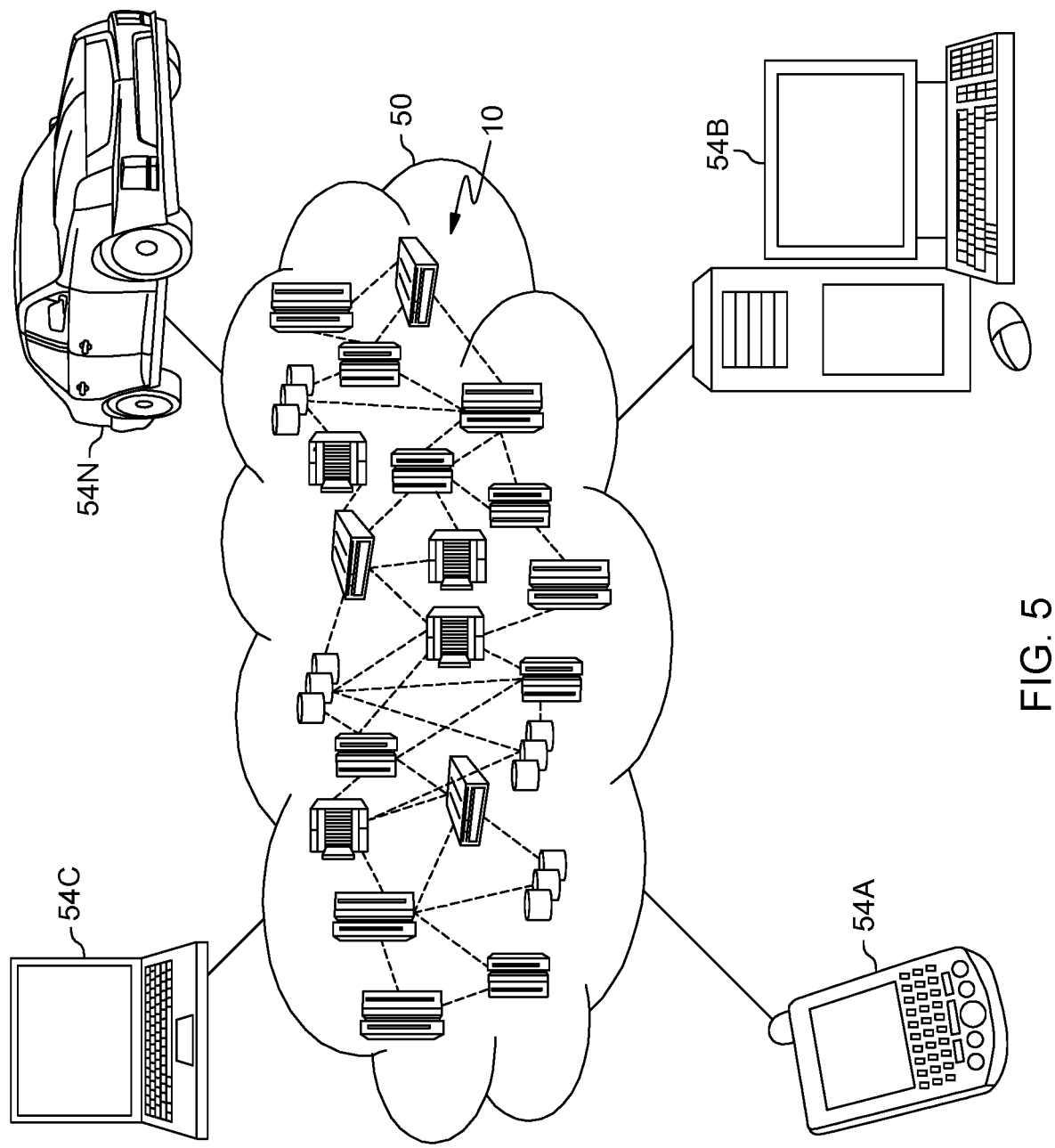
FIG. 5 depicts a cloud computing environment, in accordance with an embodiment of the present invention.
Figure 6:
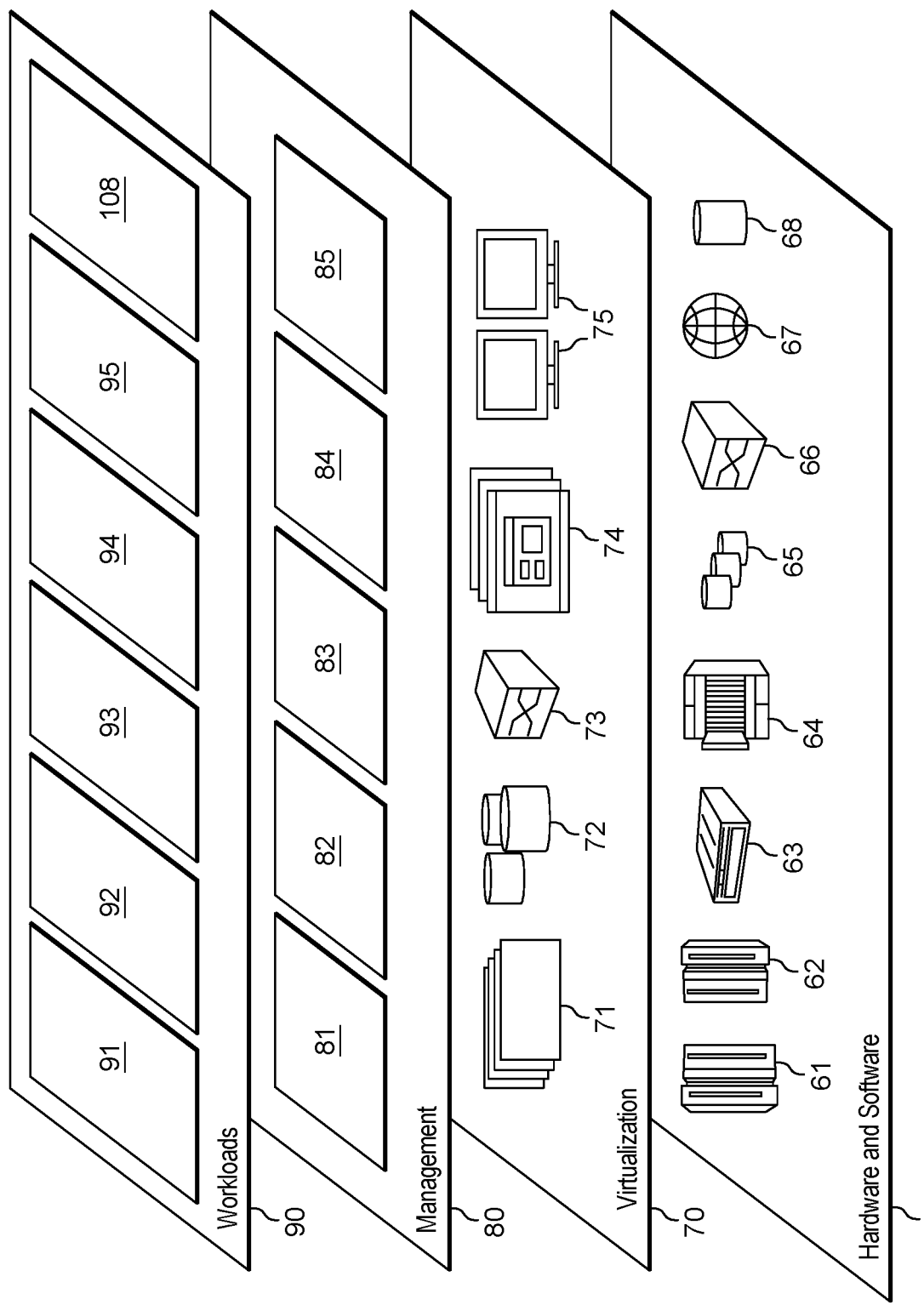
FIG. 6 depicts abstraction model layers, in accordance with an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cluster compliance program 108.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising: receiving, by one or more processors, data collected from a plurality of vehicles for a plurality of clusters, where the data collected from each of the plurality of vehicles includes a registered event; generating, by the one or more processors, an initial set of rules for the plurality of vehicles operating in each cluster from the plurality of clusters based on the data collected from the plurality of vehicles; determining, by the one or more processors, a first cluster out of the plurality of cluster based on a geolocation of a first vehicle out of the plurality of vehicles traveling along a route; responsive to identifying a set of cluster specific rules for the first cluster based on the geolocation of the first vehicle, determining, by the one or more processors, whether a plurality of hardware requirements defined by the set of cluster specific rules are present on the first vehicle; responsive to determining a first hardware requirement out of the plurality of hardware requirements defined by the set of cluster specific rules is not present on the first vehicle, identifying, by the one or more processors, an alternative cluster based on the first hardware requirement being absent; and instructing, by the one or more processors, the first vehicle to travel to the alternative cluster.

2. The method of claim 1, wherein identifying the alternative cluster based on the first hardware requirement being absent further comprises: identifying, by the one or more processors, a plurality of surrounding clusters, wherein each of the plurality of surrounding clusters share a border with the first cluster; determining, by the one or more processors, whether the plurality of surrounding clusters include the first hardware requirement being absent from the first vehicle; responsive to determining a first surrounding cluster and a second surrounding cluster from the plurality of surrounding clusters do not include the first hardware requirement, ranking, by the one or more processors, the first surrounding cluster and the second surrounding clusters based on one or more travel preferences selected from a group consisting of: a shortest route, a fastest route, a route with a least amount of delay, a route avoiding highways, and a route with no tolls; and responsive to ranking the first surrounding cluster higher than the second surrounding cluster, identifying, by the one or more processors, the first surrounding cluster as the alternative cluster.

3. The method of claim 1, wherein instructing the first vehicle to travel to the alternative cluster further comprises: displaying, by the one or more processors, a status message to an operator of the first vehicle, wherein the status message states that the first vehicle fails to adhere to the first hardware requirement; and displaying, by the one or more processors, an alternative route on a map and an overlay on the map highlighting the first cluster and the alternative cluster.

4. The method of claim 1, further comprising: determining, by the one or more processors, a second cluster out of the plurality of cluster based on the geolocation of the first vehicle out of the plurality of vehicles traveling along the route, wherein a portion of the first cluster overlaps a portion of the second cluster; and responsive to determining the first cluster takes priority over the second cluster based on a classification of a static consideration, identifying, by the one or more processors, the set of cluster specific rules for the first cluster based on the geolocation of the first vehicle.

5. The method of claim 1, wherein the first cluster represents a geographical area defined by one or more static considerations selected from a group consisting of: towns, cities, states, regions, and countries.

6. The method of claim 1, wherein the first cluster represents a geographical area defined by one or more dynamic considerations selected from a group consisting of: severe weather, dense fog, flash flooding, wildlife activity, police activity, and vehicle restrictions.

7. The method of claim 1, wherein the first hardware requirement is an infrared camera.

8. A computer program product comprising: one or more non-transitory computer readable storage media and program instructions stored on at least one of the one or more non-transitory computer readable storage media for execution by a processors, the program instructions comprising: program instructions to receive data collected from a plurality of vehicles for a plurality of clusters, where the data collected from each of the plurality of vehicles includes a registered event; program instructions to generate an initial set of rules for the plurality of vehicles operating in each cluster from the plurality of clusters based on the data collected from the plurality of vehicles; program instructions to determine a first cluster out of the plurality of cluster based on a geolocation of a first vehicle out of the plurality of vehicles traveling along a route; program instructions to, responsive to identifying a set of cluster specific rules for the first cluster based on the geolocation of the first vehicle, determine whether a plurality of hardware requirements defined by the set of cluster specific rules are present on the first vehicle; program instructions to, responsive to determining a first hardware requirement out of the plurality of hardware requirements defined by the set of cluster specific rules is not present on the first vehicle, identify an alternative cluster based on the first hardware requirement being absent; and program instructions to instruct the first vehicle to travel to the alternative cluster.

9. The computer program product of claim 8, wherein identifying the alternative cluster based on the first hardware requirement being absent further comprises program instructions, stored on the one or more non-transitory computer readable storage media, which when executed by the processor, cause the processor to: identify a plurality of surrounding clusters, wherein each of the plurality of surrounding clusters share a border with the first cluster; determine whether the plurality of surrounding clusters include the first hardware requirement being absent from the first vehicle; responsive to determining a first surrounding cluster and a second surrounding cluster from the plurality of surrounding clusters do not include the first hardware requirement, rank the first surrounding cluster and the second surrounding clusters based on one or more travel preferences selected from a group consisting of: a shortest route, a fastest route, a route with a least amount of delay, a route avoiding highways, and a route with no tolls; and responsive to ranking the first surrounding cluster higher than the second surrounding cluster, identify the first surrounding cluster as the alternative cluster.

10. The computer program product of claim 8, wherein instructing the first vehicle to travel to the alternative cluster further comprises program instructions, stored on the one or more non-transitory computer readable storage media, which when executed by the processor, cause the processor to: display a status message to an operator of the first vehicle, wherein the status message states that the first vehicle fails to adhere to the first hardware requirement; and display an alternative route on a map and an overlay on the map highlighting the first cluster and the alternative cluster.

11. The computer program product of claim 8, further comprising program instructions, stored on the one or more non-transitory computer readable storage media, which when executed by the processor, cause the processor to: determine a second cluster out of the plurality of cluster based on the geolocation of the first vehicle out of the plurality of vehicles traveling along the route, wherein a portion of the first cluster overlaps a portion of the second cluster; and responsive to determining the first cluster takes priority over the second cluster based on a classification of a static consideration, identify the set of cluster specific rules for the first cluster based on the geolocation of the first vehicle.

12. The computer program product of claim 8, wherein the first cluster represents a geographical area defined by one or more static considerations selected from a group consisting of: towns, cities, states, regions, and countries.

13. The computer program product of claim 8, wherein the first cluster represents a geographical area defined by one or more dynamic considerations selected from a group consisting of: severe weather, dense fog, flash flooding, wildlife activity, police activity, and vehicle restrictions.

14. The computer program product of claim 8, wherein the first hardware requirement is an infrared camera.

15. A computer system comprising: one or more computer processors; one or more non-transitory computer readable storage media; and program instructions stored on the one or more non-transitory computer readable storage media for execution by at least one of the one or more computer processors, the program instructions comprising: program instructions to receive data collected from a plurality of vehicles for a plurality of clusters, where the data collected from each of the plurality of vehicles includes a registered event; program instructions to generate an initial set of rules for the plurality of vehicles operating in each cluster from the plurality of clusters based on the data collected from the plurality of vehicles; program instructions to determine a first cluster out of the plurality of cluster based on a geolocation of a first vehicle out of the plurality of vehicles traveling along a route; program instructions to, responsive to identifying a set of cluster specific rules for the first cluster based on the geolocation of the first vehicle, determine whether a plurality of hardware requirements defined by the set of cluster specific rules are present on the first vehicle; program instructions to, responsive to determining a first hardware requirement out of the plurality of hardware requirements defined by the set of cluster specific rules is not present on the first vehicle, identify an alternative cluster based on the first hardware requirement being absent; and program instructions to instruct the first vehicle to travel to the alternative cluster.

16. The computer system of claim 15, wherein identifying the alternative cluster based on the first hardware requirement being absent further comprises program instructions, stored on the one or more non-transitory computer readable storage media, which when executed by the one or more computer processors, cause the one or more computer processors to: identify a plurality of surrounding clusters, wherein each of the plurality of surrounding clusters share a border with the first cluster; determine whether the plurality of surrounding clusters include the first hardware requirement being absent from the first vehicle; responsive to determining a first surrounding cluster and a second surrounding cluster from the plurality of surrounding clusters do not include the first hardware requirement, rank the first surrounding cluster and the second surrounding clusters based on one or more travel preferences selected from a group consisting of: a shortest route, a fastest route, a route with a least amount of delay, a route avoiding highways, and a route with no tolls; and responsive to ranking the first surrounding cluster higher than the second surrounding cluster, identify the first surrounding cluster as the alternative cluster.

17. The computer system of claim 15, wherein instructing the first vehicle to travel to the alternative cluster further comprises program instructions, stored on the one or more non-transitory computer readable storage media, which when executed by the one or more computer processors, cause the one or more computer processors to: display a status message to an operator of the first vehicle, wherein the status message states that the first vehicle fails to adhere to the first hardware requirement; and display an alternative route on a map and an overlay on the map highlighting the first cluster and the alternative cluster.

18. The computer system of claim 15, further comprising program instructions, stored on the one or more non-transitory computer readable storage media, which when executed by the one or more computer processors, cause the one or more computer processors to: determine a second cluster out of the plurality of cluster based on the geolocation of the first vehicle out of the plurality of vehicles traveling along the route, wherein a portion of the first cluster overlaps a portion of the second cluster; and responsive to determining the first cluster takes priority over the second cluster based on a classification of a static consideration, identify the set of cluster specific rules for the first cluster based on the geolocation of the first vehicle.

19. The computer system of claim 15, wherein the first cluster represents a geographical area defined by one or more static considerations selected from a group consisting of: towns, cities, states, regions, and countries.

20. The computer system of claim 15, wherein the first cluster represents a geographical area defined by one or more dynamic considerations selected from a group consisting of: severe weather, dense fog, flash flooding, wildlife activity, police activity, and vehicle restrictions.

* * * * *